(12) United States Patent
Yamamoto

(10) Patent No.: US 11,295,544 B2
(45) Date of Patent: Apr. 5, 2022

(54) VEHICLE EXTERIOR ENVIRONMENT RECOGNITION APPARATUS

(71) Applicant: SUBARU CORPORATION, Tokyo (JP)

(72) Inventor: Yosuke Yamamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/060,324

(22) Filed: Oct. 1, 2020

(65) Prior Publication Data
US 2021/0117706 A1    Apr. 22, 2021

(30) Foreign Application Priority Data

Oct. 17, 2019    (JP) .............................. JP2019-190010

(51) Int. Cl.
| | | |
|---|---|---|
| G06V 20/00 | (2022.01) | |
| G06V 20/58 | (2022.01) | |
| G08G 1/16 | (2006.01) | |

(52) U.S. Cl.
CPC ........... *G06V 20/584* (2022.01); *G08G 1/166* (2013.01)

(58) Field of Classification Search
CPC ........................... G06K 9/00825; G08G 1/166
See application file for complete search history.

(56) References Cited

U.S. PATENT DOCUMENTS

| | | | | |
|---|---|---|---|---|
| 2007/0046450 | A1* | 3/2007 | Iwama | G01S 11/12 340/436 |
| 2013/0129150 | A1* | 5/2013 | Saito | G06K 9/00825 382/104 |
| 2014/0132769 | A1* | 5/2014 | Kido | G06K 9/00791 348/148 |
| 2016/0182823 | A1* | 6/2016 | Murasumi | B60R 11/04 348/38 |
| 2016/0379070 | A1* | 12/2016 | Kasaoki | G06T 7/70 348/148 |
| 2017/0091566 | A1* | 3/2017 | Kasaoki | H04N 5/2351 |
| 2017/0144585 | A1* | 5/2017 | Ogawa | G06K 9/6215 |
| 2017/0144587 | A1* | 5/2017 | Ogawa | H05B 47/125 |
| 2019/0294899 | A1* | 9/2019 | Okubo | G06K 9/00825 |

(Continued)

FOREIGN PATENT DOCUMENTS

| | | |
|---|---|---|
| JP | 3349060 B2 | 11/2002 |
| JP | 3872179 B2 | 1/2007 |

*Primary Examiner* — Md K Talukder
(74) *Attorney, Agent, or Firm* — McDermott Will & Emery LLP

(57) ABSTRACT

A vehicle exterior environment recognition apparatus includes an image acquisition unit and a paired light source identification unit. The image acquisition unit acquires first and second luminance images. The paired light source identification unit extracts light sources from the first luminance image, to identify, as paired light sources, a pair of light sources out of the light sources extracted from the first luminance image, on the basis of positional relation of the light sources extracted. The paired light source identification unit extracts light sources from the second luminance image on the condition that the light sources extracted from the first luminance image are devoid of the paired light sources, to identify, as the paired light sources, one of the light sources extracted from the first luminance image and one of the light sources extracted from the second luminance image.

5 Claims, 7 Drawing Sheets

(56) References Cited

U.S. PATENT DOCUMENTS

| | | | |
|---|---|---|---|
| 2020/0126328 A1* | 4/2020 | Watabe | G08G 1/00 |
| 2020/0210730 A1* | 7/2020 | Okubo | G06K 9/00798 |
| 2021/0117706 A1* | 4/2021 | Yamamoto | G08G 1/166 |

* cited by examiner

VEHICLE EXTERIOR ENVIRONMENT RECOGNITION APPARATUS

CROSS-REFERENCE TO RELATED APPLICATIONS

This application claims priority from Japanese Patent Application No. 2019-190010 filed on Oct. 17, 2019, the entire contents of which are hereby incorporated by reference.

BACKGROUND

The disclosure relates to a vehicle exterior environment recognition apparatus that identifies a specific object present in a traveling direction of an own vehicle.

Techniques have been known that include detecting three-dimensional objects, e.g., vehicles, ahead of an own vehicle and making a collision avoidance control and/or a cruise control. The collision avoidance control includes avoiding a collision with a preceding vehicle. The cruise control includes keeping a safe distance to the preceding vehicle. For example, reference is made to Japanese Patent No. 3349060. To provide such a control, techniques have been disclosed that include, for example, detecting lighting up of brake lamps on the basis of changes in luminance or changes in area of a predetermined detection region, to determine a deceleration state of a preceding vehicle. For example, reference is made to Japanese Patent No. 3872179.

SUMMARY

An aspect of the technology provides a vehicle exterior environment recognition apparatus including an image acquisition unit and a paired light source identification unit. The image acquisition unit is configured to acquire a plurality of luminance images including a first luminance image and a second luminance image. The first luminance image and the second luminance image are captured by respective image-capturing units having differently-oriented optical axes. The paired light source identification unit is configured to extract light sources from the first luminance image, to identify, as paired light sources, a pair of light sources out of the light sources extracted from the first luminance image, on the basis of positional relation of the light sources extracted. The paired light source identification unit is configured to extract light sources from the second luminance image on the condition that the light sources extracted from the first luminance image are devoid of the paired light sources, to identify, as the paired light sources, one of the light sources extracted from the first luminance image and one of the light sources extracted from the second luminance image.

An aspect of the technology provides a vehicle exterior environment recognition apparatus including circuitry. The circuitry is configured to acquire a plurality of luminance images including a first luminance image and a second luminance image. The first luminance image and the second luminance image are captured by respective image-capturing units having differently-oriented optical axes. The circuitry is configured to extract light sources from the first luminance image, to identify, as paired light sources, a pair of light sources out of the light sources extracted from the first luminance image, on the basis of positional relation of the light sources extracted. The circuitry is configured to extract light sources from the second luminance image on the condition that the light sources extracted from the first luminance image are devoid of the paired light sources, to identify, as the paired light sources, one of the light sources extracted from the first luminance image and one of the light sources extracted from the second luminance image.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
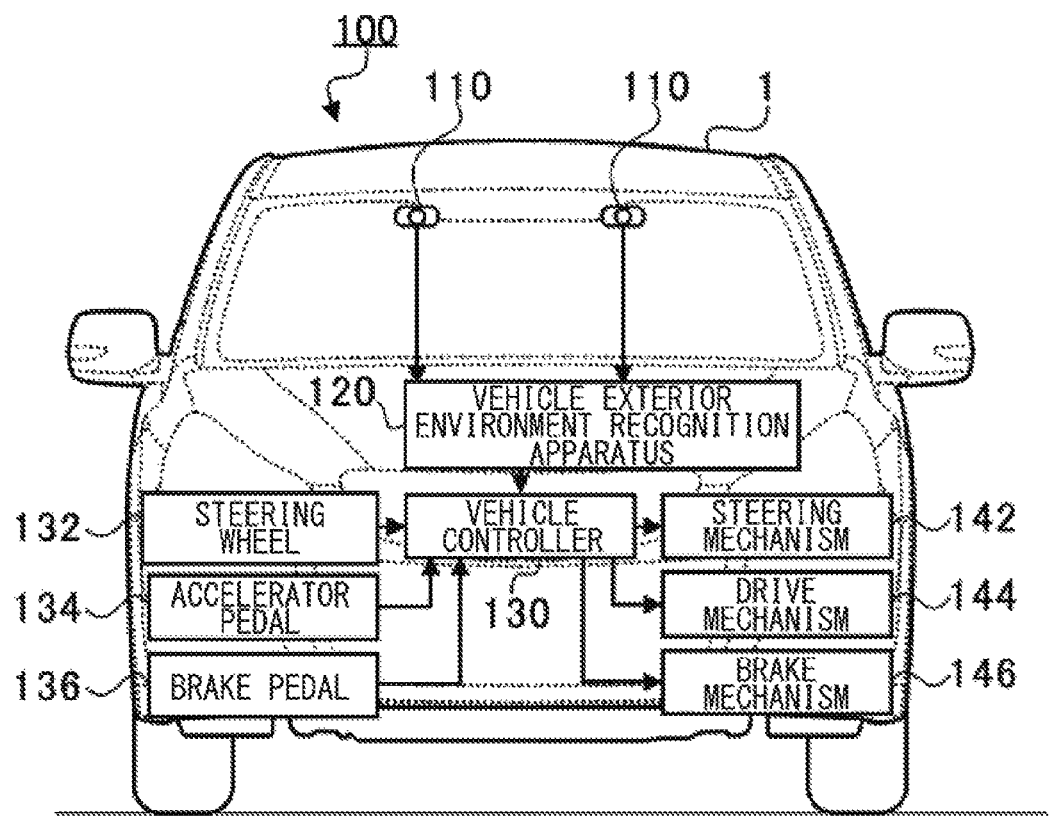
FIG. 1 is a block diagram illustrating a relation of connection in a vehicle exterior environment recognition system.

Tail lamps and brake lamps are transversely symmetrically arranged on a rear surface of a preceding vehicle and are supposed to be level with each other and have an equal relative distance from an own vehicle. To identify a preceding vehicle, it is desirable not only to recognize each of the tail lamps and the brake lamps as a single light source but also to recognize the tail lamps or the brake lamps as paired light sources. Recognizing light sources as paired light sources makes it possible to attain enhanced precision of identification of a preceding vehicle.

However, external factors such as raindrops and snow may cause one of the light sources, e.g., the tail lamps and the brake lamps, to become invisible or to appear blurring to cause a change in area of lighting up. This may result in a failure in identification of paired light sources, contributing to lowered precision of identification of a preceding vehicle and/or a delay in a speed control with respect to the preceding vehicle.

It is desirable to provide a vehicle exterior environment recognition apparatus that makes it possible to appropriately identify paired light sources.

In the following, some preferred but non-limiting embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

(Vehicle Exterior Environment Recognition System 100)

FIG. 1 is a block diagram illustrating a relation of connection in a vehicle exterior environment recognition system 100. The vehicle exterior environment recognition system 100 may include image-capturing units 110, a vehicle exterior environment recognition apparatus 120, and a vehicle controller 130. The vehicle controller 130 may include, for example, an electronic control unit (ECU). The embodiment may include an example with the two image-capturing units 110 without limitation.

The image-capturing units 110 may each include an imaging device such as, but not limited to, a charge-coupled device (CCD) and a complementary metal-oxide semiconductor (CMOS). The image-capturing units 110 may each capture an image of vehicle exterior environment ahead of an own vehicle 1, and generate a luminance image. The luminance image may include at least luminance information, and be provided in the form of a color image or a monochrome image. The two image-capturing units 110 may be so disposed that their respective optical axes become substantially parallel to each other along a traveling direction of the own vehicle 1. The two image-capturing units 110 may be so disposed as to be separated away from each other in a substantially horizontal direction. The image-capturing units 110 may continuously generate the luminance image for each frame of, for example but not limited to, 1/60 second (at a frame rate of 60 fps). The luminance image may include a capture of a three-dimensional object present in a detection region ahead of the own vehicle 1.

The vehicle exterior environment recognition apparatus 120 may acquire the luminance image from each of the two image-capturing units 110, to recognize vehicle exterior environment such as behavior of preceding vehicles and on-coming vehicles, and conditions of a travel path, on the basis of the two luminance images. On the basis of the vehicle exterior environment recognized, and on the basis of traveling states of the own vehicle 1, the vehicle exterior environment recognition apparatus 120 may make a travel control of the own vehicle 1, e.g., a speed control and a steering angle control. The vehicle exterior environment recognition apparatus 120 is described later in detail.

The vehicle controller 130 may receive an input of a driver's operation through a steering wheel 132, an accelerator pedal 134, and a brake pedal 136, and transmit the input to a steering mechanism 142, a drive mechanism 144, and a brake mechanism 146, to control the own vehicle 1. The vehicle controller 130 may control the steering mechanism 142, the drive mechanism 144, and the brake mechanism 146 in accordance with an instruction from the vehicle exterior environment recognition apparatus 120.

(Vehicle Exterior Environment Recognition Apparatus 120)

Figure 2:
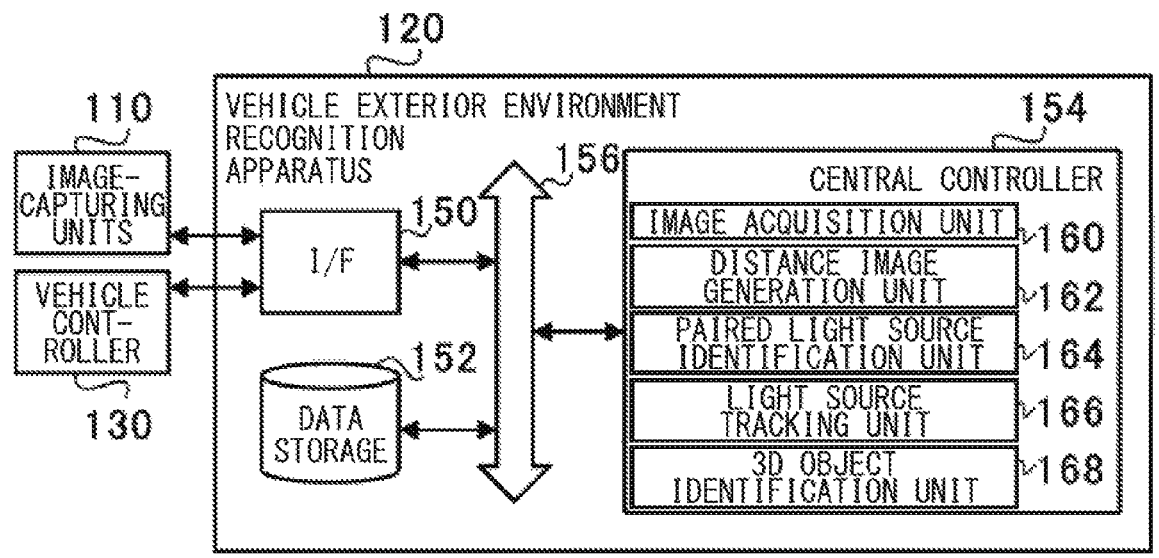
FIG. 2 is a block diagram illustrating, in outline, subunits of a vehicle exterior environment recognition apparatus.

FIG. 2 is a block diagram illustrating, in outline, subunits of the vehicle exterior environment recognition apparatus 120. As illustrated in FIG. 2, the vehicle exterior environment recognition apparatus 120 may include an I/F 150, a data storage 152, and a central controller 154.

The I/F 150 is an interface that carries out bi-directional information exchange with the image-capturing units 110 and the vehicle controller 130. The data storage 152 may include, for example, a RAM (Random Access Memory), a flash memory, and an HDD (Hard Disk Drive), and hold various pieces of information involved in processing by the subunits described below.

The central controller 154 may include a semiconductor integrated circuit including, for example, a CPU (Central Processing Unit), a ROM (Read Only Memory), and a RAM. The ROM may hold, for example, programs. The RAM may serve as a work area. The central controller 154 may control, for example, the I/F 150 and the data storage 152 through a system bus 156. In the embodiment, the central controller 154 may include an image acquisition unit 160, a distance image generation unit 162, a paired light source identification unit 164, a light source tracking unit 166, and a three-dimensional object identification unit 168. In the following, a vehicle exterior environment recognition method according to the embodiment is described in detail, together with operation of the subunits of the central controller 154. The vehicle exterior environment recognition method includes recognizing light sources ahead of the own vehicle 1 and identifying a region of a three-dimensional object such as a preceding vehicle.

(Vehicle Exterior Environment Recognition Method)

Figure 3:
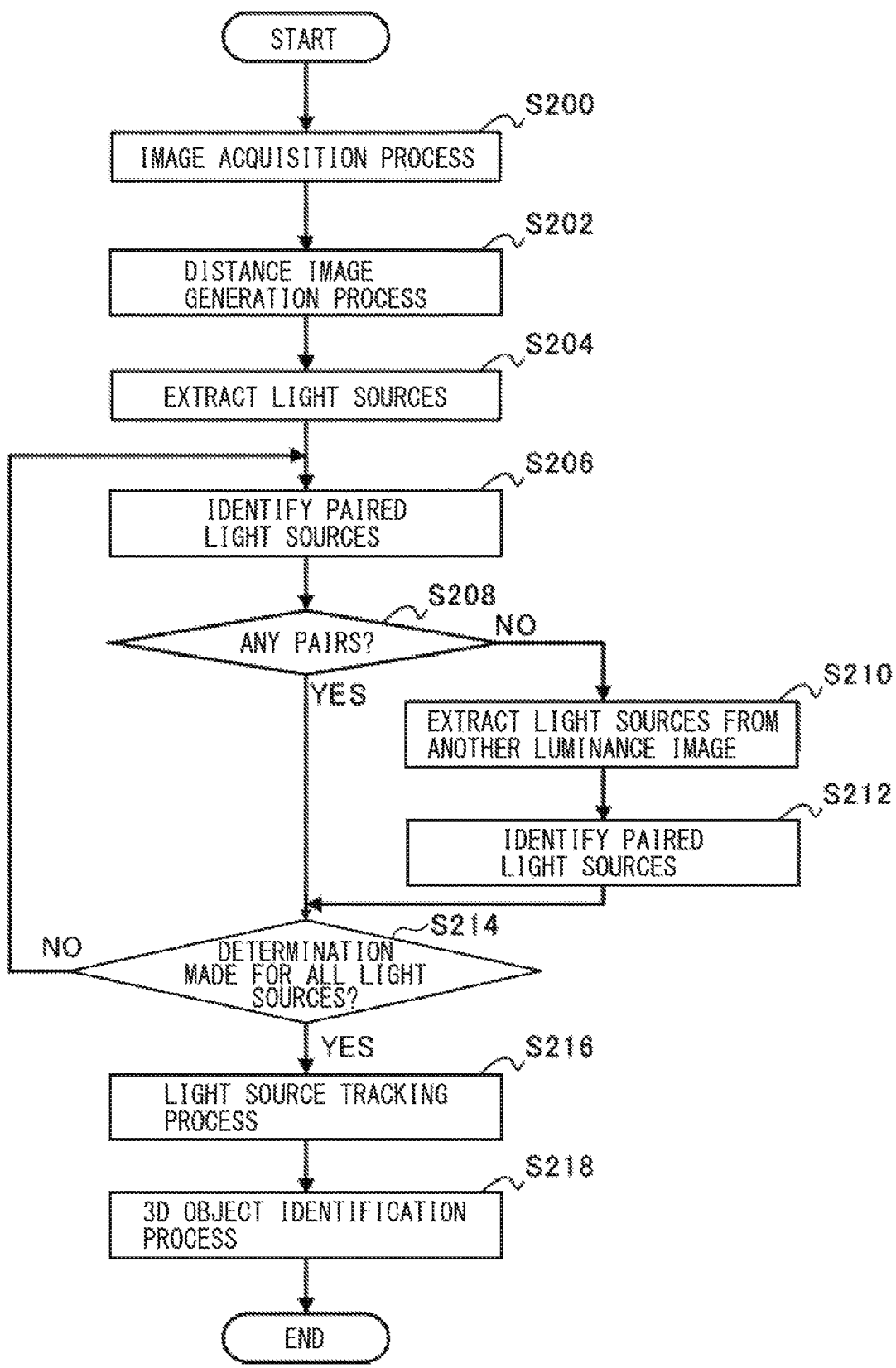
FIG. 3 is a flowchart illustrating a flow of a vehicle exterior environment recognition method.

FIG. 3 is a flowchart illustrating a flow of the vehicle exterior environment recognition method. The processing in the flowchart may be executed on cycles of predetermined interrupt time. In the vehicle exterior environment recognition method, first, the image acquisition unit 160 may acquire a plurality of the luminance images (S200). Thereafter, the distance image generation unit 162 may generate a distance image (S202). Thereafter, the paired light source identification unit 164 may extract light sources from the luminance image, and identify, as paired light sources, a pair of light sources out of the light sources extracted, on the basis of positional relation of the light sources extracted (S204 to S214). Thereafter, the light source tracking unit 166 may track each of the light sources extracted (S216). Thereafter, the three-dimensional object identification unit 168 may identify a three-dimensional object on the basis of the paired light sources (S218). In the following, each process of the vehicle exterior environment recognition method is described in detail, and description of processes irrelevant to the embodiment is omitted.

(Image Acquisition Process S200)

Figure 4A:
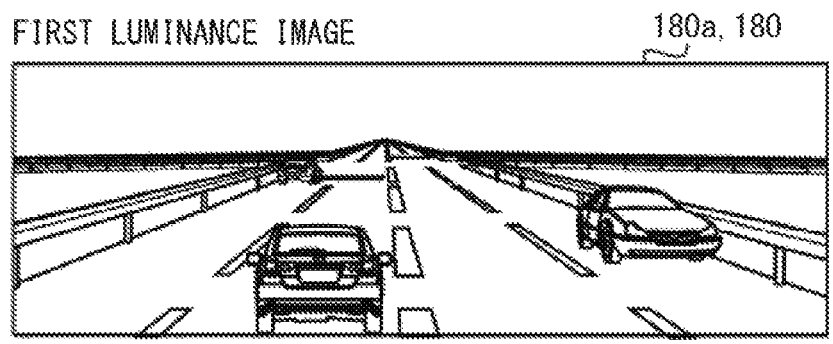
FIGS. 4A and 4B describe an example of acquisition of a first luminance image and a second luminance image.
Figure 4B:
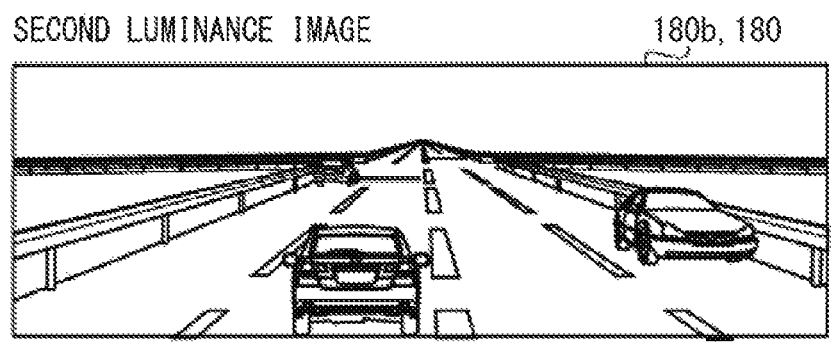

FIGS. 4A and 4B illustrate an example of acquisition of the luminance images. The image acquisition unit 160 acquires the plurality of the luminance images, e.g., the two luminance images in the embodiment. The plurality of the luminance images is captured by the image-capturing units 110 having differently-oriented optical axes. Let us assume that the image acquisition unit 160 acquires a first luminance image 180a as illustrated in FIG. 4A and a second luminance image 180b as illustrated in FIG. 4B. The first luminance image 180a may be captured by the image-capturing unit 110 located on the relatively right side of the own vehicle 1. The second luminance image 180b may be captured by the image-capturing unit 110 located on the relatively left side of the own vehicle 1.

In this example, the first luminance image 180a may be given as the luminance image 180 captured by the image-capturing unit 110 located on the relatively right side of the own vehicle 1, while the second luminance image 180b may be given as the luminance image 180 captured by the image-capturing unit 110 located on the relatively left side of the own vehicle 1. However, this is non-limiting. The luminance image 180 captured by the image-capturing unit 110 located on the relatively left side of the own vehicle 1 may serve as the first luminance image 180*a*, while the luminance image 180 captured by the image-capturing unit 110 located on the relatively right side of the own vehicle 1 may serve as the second luminance image 180*b*.

Referring to FIGS. 4A and 4B, the image capturing units 110 capture images at different positions, causing a difference in horizontal positions of a three-dimensional object in the first luminance image 180*a* and the second luminance image 180*b*. The term horizontal refers to a transverse direction in an image captured. The term vertical refers to a longitudinal direction in the image captured.

The three-dimensional object to be included in the luminance image refers to an object that is present independently ahead of the own vehicle 1, as well as an object identifiable as a part of the independently present object. Non-limiting examples of the independently present three-dimensional object may include a vehicle such as a preceding vehicle and an on-coming vehicle, a bicycle, a pedestrian, a traffic light, a road or a travel path, a road sign, a guardrail, and a building. Non-limiting examples of the object identifiable as a part of the independently present object may include back-up lamps and tail lamps of the vehicle.

(Distance Image Generation Process S202)

Figure 5A:
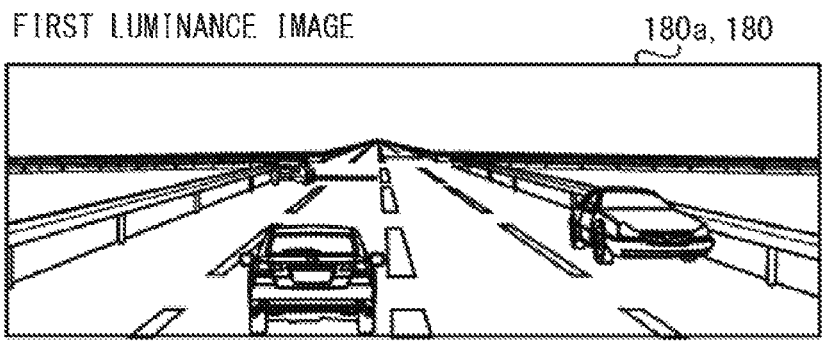
FIGS. 5A to 5C describe an example of generation of a distance image from the first luminance image and the second luminance image.
Figure 5B:
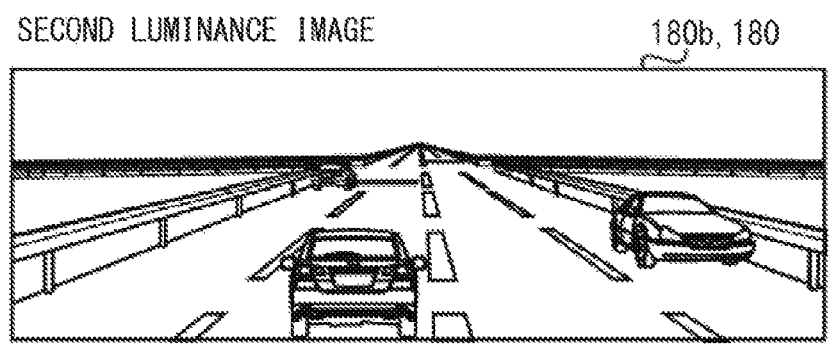
Figure 5C:
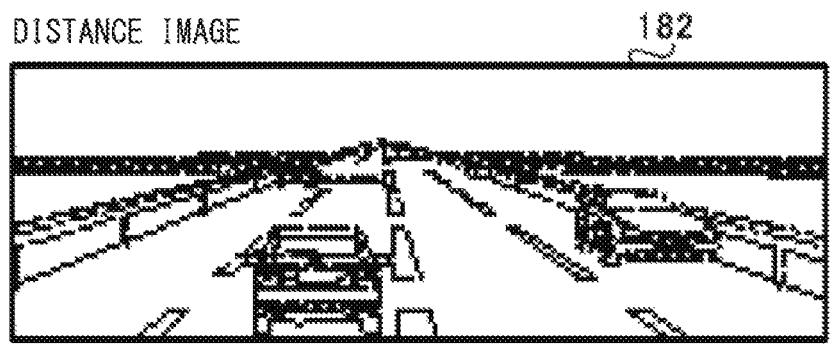

FIGS. 5A to 5C illustrate an example of generation of the distance image. The distance image generation unit 162 may generate a distance image 182 as illustrated in FIG. 5C, on the basis of the first luminance image 180*a* illustrated in FIG. 5A and the second luminance image 180*b* illustrated in FIG. 5B. The first luminance image 180*a* and the second luminance image 180*b* may be acquired by the image acquisition unit 160.

In one example, the distance image generation unit 162 may derive parallax information with the use of so-called pattern matching. The pattern matching includes searching one of the luminance images, e.g., the second luminance image 180*b*, for a corresponding block to any block extracted from another of the luminance images, e.g., the first luminance image 180*a*. A block means, for example, an array of 4 pixels horizontally by 4 pixels vertically. The parallax information includes parallax, and an image position indicating where any block is positioned in an image. The pattern matching may possibly include comparing a pair of images with respect to luminance (Y) in units of blocks. Non-limiting examples may include techniques such as, but not limited to, SAD (Sum of Absolute Difference), SSD (Sum of Squared intensity Difference), and NCC (Normalized Cross Correlation). The SAD includes obtaining a difference in the luminance. The SSD includes using the difference squared. The NCC includes obtaining a degree of similarity of a variance obtained by subtracting an average from luminance of each pixel.

The distance image generation unit 162 may perform such parallax derivation processing in units of blocks with respect to all blocks displayed in the detection region of, for example, 600 pixels by 200 pixels. Here, each block is assumed to include 4 pixels by 4 pixels, but the number of pixels in each block may be set at any value.

The distance image generation unit 162 is configured to derive the parallax with respect to each block as a unit of resolution of detection, but is not configured to recognize what three-dimensional object the relevant block is a part of. It follows, therefore, that the parallax information is derived not in units of three-dimensional objects but in units of the resolution of detection in the detection region, e.g., independently in units of blocks. In FIG. 5C, for purposes of description, the block with respect to which the parallax is derived is represented by a black dot.

The distance image generation unit 162 is configured to convert the parallax information in units of blocks in the distance image 182 into three-dimensional positional information with the use of a so-called stereo method, to derive a relative distance. The stereo method is a method of deriving, from the parallax of an object, a relative distance to the image-capturing units 110 of the relevant object with the use of triangulation.

(Paired Light Source Identification Process S204 to S214)

The vehicle exterior environment recognition apparatus 120 may perform grouping of blocks, as an object. The grouping may be made with the use of luminance values, i.e., color values, based on the luminance images 180, and with the use of the three-dimensional positional information in real space. The positional information may be calculated on the basis of the distance image 182, and include a relative distance to the own vehicle 1. The blocks to be grouped may have equal color values, and have the positional information indicating that the blocks are close to one another in the three-dimensional space. Thereafter, the vehicle exterior environment recognition apparatus 120 may identify what kind of specific object, e.g., a preceding vehicle, the object in the detection region ahead of the own vehicle 1 corresponds to. Description is given here of a process of identifying such a specific object, in particular, a process of identifying paired light sources that provide a clue to identification of a preceding vehicle.

Figure 6A:
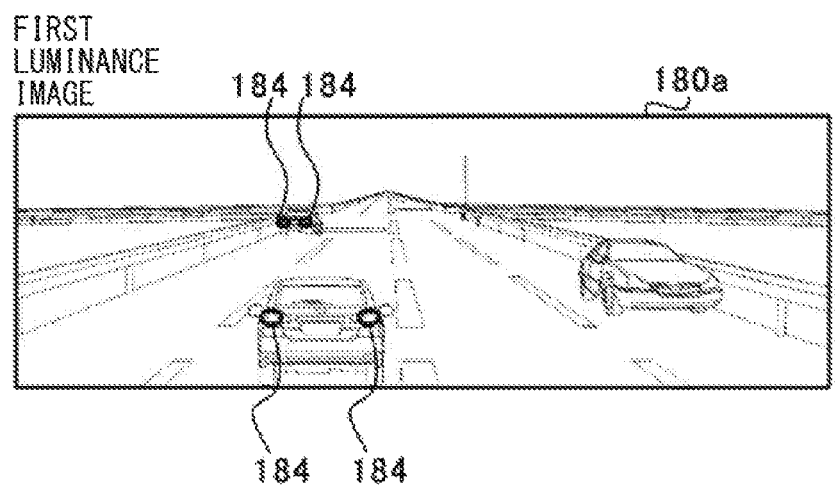
FIGS. 6A and 6B describe an example of a paired light source identification process.
Figure 6B:
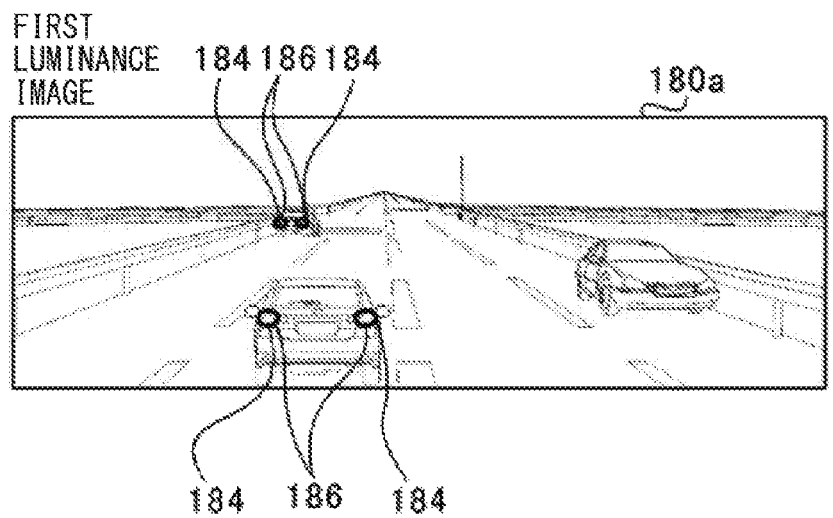

FIGS. 6A and 6B, and FIGS. 7A, 7B, and 7C illustrate an example of a paired light source identification process. As illustrated in FIG. 6A, the paired light source identification unit 164 may extract, from one of the luminance images 180, e.g., the first luminance image 180*a*, light sources 184, or individual light sources 184, having luminance and color distribution corresponding to those of the tail lamps and the brake lamps (S204).

In a case where luminance of the light sources 184 is too high, the image-capturing units 110 may generate the luminance images 180 with shortened exposure time. Alternatively, the image-capturing units 110 may alternately generate the luminance images 180 with exposure time of a plurality of different durations, and the paired light source identification unit 164 may extract the light sources 184 on the basis of the luminance and the color distribution, from whichever of the luminance images 180 is generated with the relatively shorter exposure time.

The paired light source identification unit 164 may exclude, from presumed tail lamps and presumed brake lamps, whichever are recognized as the light sources 184 on the basis of the luminance and the color distribution but lack distances or have unidentifiable distances in the distance image 182. It is to be noted that a reflector as a three-dimensional object is sometimes similar to the tail lamps and the brake lamps in terms of its luminance and color distribution. The paired light source identification unit 164 may exclude, from the presumed tail lamps and the presumed brake lamps, whichever are recognized as the light sources 184 on the basis of the luminance and the color distribution but have predetermined sizes and shapes, e.g., a reflector.

Whichever of the light sources 184 are not excluded from the presumed tail lamps and the presumed brake lamps may be registered as lamp traces, or targets of tracking by the light source tracking unit 166 described later.

Thereafter, the paired light source identification unit 164 may refer to the distance image 182 and identify, as paired light sources 186, a pair of light sources having positions (horizontal positions, vertical positions, and relative distances) corresponding to the tail lamps or the brake lamps, on the basis of positional relation of whichever of the light sources 184 are not excluded from the presumed tail lamps and the presumed brake lamps (S206).

In one example, the paired light source identification unit 164 may accumulate points of the two light sources 184 for each of the following four conditions: (1) a horizontal distance, or a width, is equal to or smaller than a regulatory vehicle length; (2) pixels overlap vertically; (3) a difference in the relative distance falls within a predetermined range; and (4) a difference in area falls within a predetermined range. Thus, the paired light source identification unit 164 may identify, as the paired light sources 186, whichever combination is most likely to constitute a pair. For example, in the example in FIG. 6B, two pairs of the light sources 184 may be identified as the paired light sources 186.

The paired light source identification unit 164 may read out the paired light sources 186 identified in a previous frame or a past frame. In a case where the paired light sources 186 identified in a current frame are different from the paired light sources 186 in the previous frame, the paired light source identification unit 164 may compare them with respect to the points based on the four conditions given above, and identify, as the paired light sources 186, whichever has the greater number of the points, that is, whichever is more optimum as the paired light sources. At this occasion, in a case where the paired light sources 186 in the current frame has the greater number of the points, the paired light source identification unit 164 may eliminate information regarding the paired light sources 186 in the previous frame, and register the paired light sources 186 in the current frame as the target of tracking by the light source tracking unit 166.

In this way, recognizing, as the paired light sources 186, the light sources 184 as the presumed tail lamps and the presumed brake lamps makes it possible to attain enhanced precision of identification of a preceding vehicle.

However, external factors such as raindrops and snow may cause one of the light sources 184, e.g., the tail lamps and the brake lamps, to become invisible or to appear blurring to cause a change in area of lighting up from supposed area of lighting up. This may cause the paired light source identification unit 164 to fail in identifying the paired light sources 186 that are supposed to be present, contributing to lowered precision of identification of a preceding vehicle and/or a delay in a speed control with respect to the preceding vehicle. Thus, in the embodiment, the light sources 184 are extracted with the use of the second luminance image 180b different from the first luminance image 180a in which some of the light sources 184 become invisible. Hence, in the embodiment, it is possible to appropriately identify the paired light sources 186.

In one example, the paired light source identification unit 164 may determine presence or absence of any pair out of the light sources 184 in the first luminance image 180a (S208). In a case with the absence of any pairs (NO in S208), the paired light source identification unit 164 may extract the light sources 184 from another of the plurality of the luminance images 180, e.g., the second luminance image 180b (S210). Thus, the paired light source identification unit 164 may identify, as the paired light sources 186, the light source 184 extracted from the first luminance image 180a and the light source 184 extracted from the second luminance image 180b (S212). In a case with the presence of a pair (YES in S208), the paired light source identification unit 164 may proceed to the next process without executing steps S210 and S212.

Figure 7A:
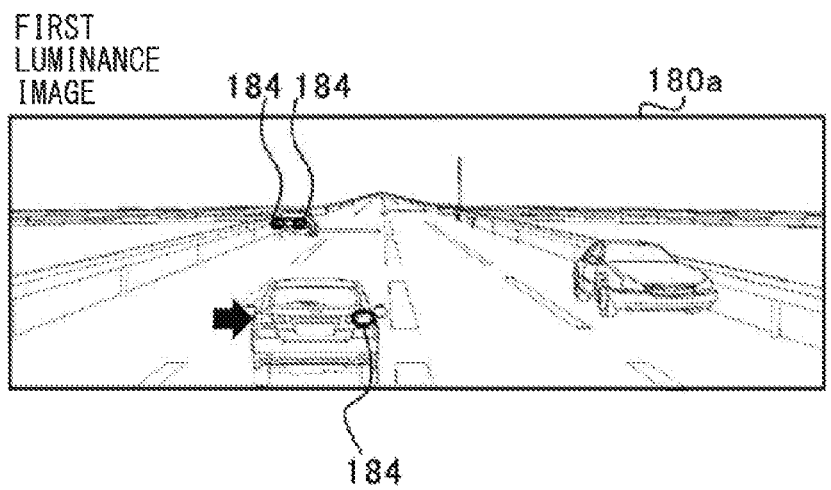
FIGS. 7A to 7C describe an example of the paired light source identification process.
Figure 7B:
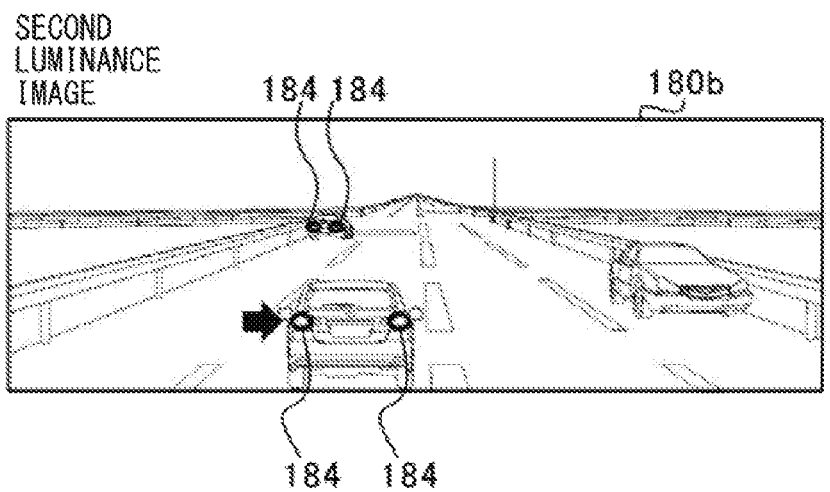
Figure 7C:
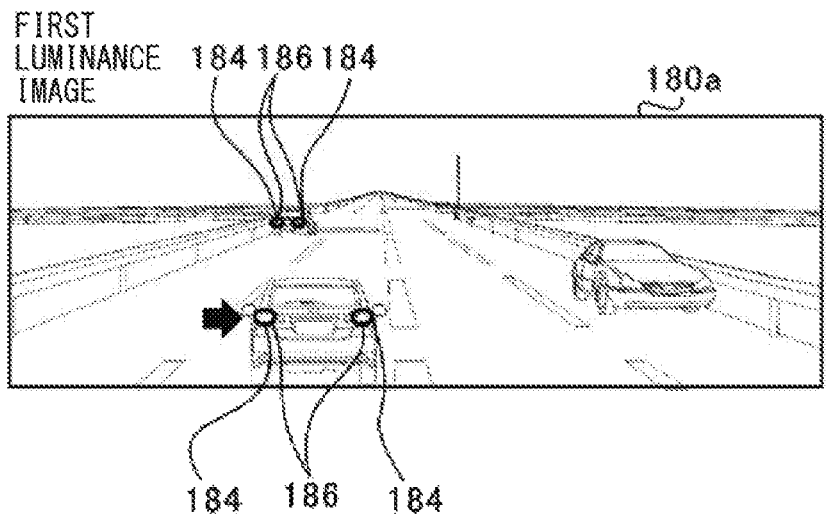

In one example, let us assume that the image acquisition unit 160 acquires the first luminance image 180a illustrated in FIG. 7A and the second luminance image 180b illustrated in FIG. 7B.

The paired light source identification unit 164 may extract the light sources 184 from the first luminance image 180a. Let us assume, however, a case where, as illustrated in FIG. 7A, the paired light source identification unit 164 refers to a result of the tracking of the light sources 184 by the light source tracking unit 166 described later, trying to extract the light sources 184 identified as the paired light sources 186 in the previous frame, but fails in extracting one of the light sources 184 identified as the paired light sources 186 in the previous frame, and determines the absence of the paired light sources 186. In this case, the paired light source identification unit 164 refers to the second luminance image 180b acquired at the same timing as the first luminance image 180a, and extract, from the second luminance image 180b, the light sources 184 one of which is denoted by an arrow in FIG. 7B.

As illustrated in FIG. 5C, the distance image 182 having the three-dimensional positional information (horizontal position, vertical position, and relative distance) may be generated in corresponding positional relation to the first luminance image 180a. However, the distance image 182 is not generated in corresponding positional relation to the second luminance image 180b. Thus, the paired light source identification unit 164 may convert the three-dimensional positional information of the light sources 184 identified as the paired light sources 186 in the previous frame into three-dimensional positional information in the second luminance image 180b, with the use of the so-called stereo method.

The paired light source identification unit 164 may extract the light sources 184 from the second luminance image 180b on the basis of luminance and color distribution of surrounding three-dimensional objects in the converted three-dimensional positional information. The paired light source identification unit 164 may convert the three-dimensional positional information regarding the light sources 184 extracted from the second luminance image 180b into the three-dimensional positional information in the first luminance image 180a, with the use of the so-called stereo method. In this way, as denoted by an arrow in FIG. 7C, the light source 184 may be correlated to the first luminance image 180a.

The paired light source identification unit 164 may identify, as the paired light sources 186, the light source 184 extracted from the first luminance image 180a and the light source 184 extracted from the second luminance image 180b and correlated to the first luminance image 180a.

In a case where such paired light sources 186 are identified as the same target consecutively the predetermined number of times or more, e.g., 5 times or more, the relevant paired light sources 186 may have higher reliability as the paired light sources 186, or alternatively, a preceding vehicle including the relevant paired light sources 186 may have a higher value of determination as to vehicle-likeliness. For example, in a case where one of the light sources 184 is presumed to form a pair with any one of a plurality of the light sources 184, the relevant light source 184 may form a pair with whichever has the higher reliability as the paired light sources 186.

The paired light source identification unit 164 may repeat step S206 and subsequent steps until the determination is made as to the presence or absence of the paired light sources 186 with respect to all the light sources 184 extracted as the presumed tail lamps and the presumed brake lamps from the first luminance image 180a (NO in S214). In a case where the determination has been made as to the presence or absence of the paired light sources 186 with respect to all the light sources 184 (YES in S214), the processing may proceed to a light source tracking process S216.

(Light Source Tracking Process S216)

The light source tracking unit 166 may track the light sources 184 extracted as the presumed tail lamps and the presumed brake lamps by the paired light source identification unit 164, on the basis of the positional information regarding the light sources 184 and on the basis of speeds and rotation speeds of the light sources 184. In a case where any one of the light sources 184 as the target has been already tracked or detected in the previous frame, the light source tracking unit 166 may correlate the relevant one of the light sources 184 to the light source 184 in the previous frame, in accordance with the number of the points accumulated, e.g., a rate at which pixels of the light sources 184 overlap, and similarity of the distance. Thus, the light source tracking unit 166 may give higher priority to tracking whichever light source 184 has the greater number of the points accumulated, than whichever light source 184 has the smaller number of the points accumulated.

(Three-Dimensional Object Identification Process S218)

Figure 8:
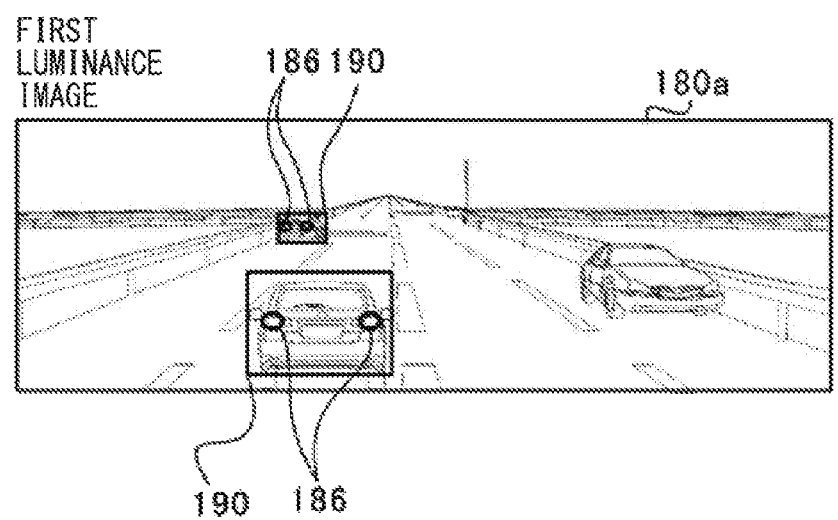
FIG. 8 describes an example of a three-dimensional object identification process.

FIG. 8 describes an example of a three-dimensional object identification process. First, the three-dimensional object identification unit 168 may perform grouping of blocks, in the distance image 182, as a three-dimensional object, e.g., a presumed preceding vehicle. The blocks to be grouped may include whichever blocks have the equal relative distance to the own vehicle 1 and are close to one another horizontally and vertically, out of a plurality of blocks located in a heightwise range of a predetermined distance or greater from a road surface. Thereafter, the three-dimensional object identification unit 168 may identify, as a three-dimensional object region 190, a rectangle region in the first luminance image 180a. The rectangle region includes all the three-dimensional objects thus identified. Here, a rectangle is formed by two vertically extending lines in contact with left and right edges of the three-dimensional object and two horizontally extending lines in contact with upper and lower edges of the three-dimensional object.

On the basis of positional relation of the three-dimensional object region 190 thus formed and the paired light sources 186, the three-dimensional object identification unit 168 may identify the three-dimensional object inside the three-dimensional object region 190 as a preceding vehicle as a specific object. In one example, the three-dimensional object identification unit 168 may identify the three-dimensional object inside the three-dimensional object region 190 as a preceding vehicle in a case where a horizontal width and a height of the three-dimensional object region 190 correspond to those of a vehicle, a difference in the relative distance between the three-dimensional object region 190 and the paired light sources 186 falls within a predetermined range, and the paired light sources 186 are positioned at an appropriate level inside the three-dimensional object region 190.

In this way, the three-dimensional object region 190 is identified as a preceding vehicle, making it possible for the vehicle exterior environment recognition apparatus 120 to make the collision avoidance control or the cruise control. The collision avoidance control includes avoiding a collision with the preceding vehicle. The cruise control includes controlling the own vehicle 1 to maintain the safe distance to the preceding vehicle.

As described, in the embodiment, it is possible to appropriately identify the paired light sources 186 on the basis of the second luminance image 180b. Hence, it is possible to stably identify a preceding vehicle and avoid lowered precision of identification of the preceding vehicle and a delay in a speed control with respect to the preceding vehicle.

There are also provided a program that causes a computer to serve as the vehicle exterior environment recognition apparatus 120, and a computer-readable recording medium that holds the program. Non-limiting examples of the recording medium may include a flexible disk, a magneto-optical disk, a ROM, a CD (compact disk), a DVD (digital versatile disk), and a BD (blue ray disk). Here, the program means a data processor described in any language or description method.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

It is to be noted that processes of the vehicle exterior environment recognition method herein do not have to be processed in the order described in the flowchart, but may include parallel processing or sub-routine processing.

According to the embodiments of the technology, it is possible to appropriately identify paired light sources.

The vehicle exterior environment recognition apparatus 120 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle exterior environment recognition apparatus 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle exterior environment recognition apparatus 120 illustrated in FIG. 1.

The invention claimed is:

1. A vehicle exterior environment recognition apparatus provided on an own vehicle, the vehicle exterior environment recognition apparatus comprising:
   an image acquisition unit configured to acquire 1) a first luminance image captured by a first image capturing unit and 2) a second luminance image captured by a second image capturing unit, the first image capturing unit and the second image capturing unit having differently oriented optical axes from one another; and a paired light source identification unit configured to:
extract light sources from the first luminance image;
determine whether the extracted light sources from the first luminance image include a pair of light sources of another vehicle based on positional relation of the light sources extracted from the first luminance image; and
when the extracted light sources from the first luminance image do not include the pair of light sources of the another vehicle, 1) extract light sources from the second luminance image and 2) identify, as the pair of light sources of the another vehicle, one of the light sources extracted from the first luminance image and one of the light sources extracted from the second luminance image such that the one of the light sources extracted from the first luminance image and the one of the light sources extracted from the second luminance image make up the pair of light sources of the another vehicle.

2. The vehicle exterior environment recognition apparatus according to claim 1, further comprising a light source tracking unit configured to track each of the light sources extracted from the first luminance image by the paired light source identification unit, wherein
the paired light source identification unit is configured to determine that the light sources extracted from the first luminance image by the paired light source identification unit does not include the pair of light sources of the another vehicle, on a basis of a result of tracking of each of the light sources of the first luminance image by the light source tracking unit.

3. The vehicle exterior environment recognition apparatus according to claim 1, wherein when the extracted light sources from the first luminance image include the pair of light sources of the another vehicle, the light sources are not extracted from the second luminance image.

4. The vehicle exterior environment recognition apparatus according to claim 1, wherein the paired light source identification unit is further configured to compare the first luminance image with a past first luminance image, the past first luminance image being captured by the first image capturing device prior to capturing the first luminance image, and wherein when light sources extracted from the past first luminance image include the pair of light sources of the another vehicle while the extracted light sources of the first luminance image do not include the pair of light sources of the another vehicle, the paired light source identification unit determines that the extracted light sources from the first luminance image include the pair of light sources of the another vehicle.

5. A vehicle exterior environment recognition apparatus provided on an own vehicle, the vehicle exterior environment recognition apparatus comprising
circuitry configured to:
acquire a first luminance image captured by a first image capturing unit and a second luminance image captured by a second image capturing unit, the first image capturing unit and the second image capturing unit having differently oriented optical axes from one another;
extract light sources from the first luminance image;
determine whether the extracted light sources from the first luminance image includes a pair of light sources of another vehicle based on positional relation of the light sources extracted from the first luminance image; and
when the extracted light sources from the first luminance image do not include the pair of light sources of the another vehicle, 1) extract light sources from the second luminance image and 2) identify, as the pair of light sources, one of the light sources extracted from the first luminance image and one of the light sources extracted from the second luminance image such that the one of the light sources extracted from the first luminance image and the one of the light sources extracted from the second luminance image make up the pair of light sources of the another vehicle.

* * * * *